(No Model.)

B. G. HANDY.
PULLEY.

No. 352,539. Patented Nov. 16, 1886.

Witnesses
James M. Colton
E. G. Siggers

Inventor
Bethuel G. Handy
By his Attorneys
C. A. Knowles

UNITED STATES PATENT OFFICE.

BETHUEL G. HANDY, OF CORNWALL, NEW YORK.

PULLEY.

SPECIFICATION forming part of Letters Patent No. 352,539, dated November 16, 1886.

Application filed April 1, 1886. Serial No. 197,469. (No model.)

*To all whom it may concern:*

Be it known that I, BETHUEL G. HANDY, a citizen of the United States, residing at Cornwall, in the county of Orange and State of New York, have invented a new and useful Improvement in Pulleys, of which the following is a specification.

My invention relates to improvements in pulleys; and it consists of the peculiar and novel construction and combination of parts, substantially as hereinafter fully set forth, and particularly pointed out in the claims.

The object of my invention is to provide an improved pulley which shall be very simple, strong, and durable in construction, thoroughly effective for the purposes designed, and comparatively cheap and inexpensive of manufacture.

A further object of my invention is to provide improved means for reducing the friction of the sheave and the bearings therefor, and for obviating the very objectionable tendency of the sheave binding under great strain and refusing to revolve.

Figure 1:
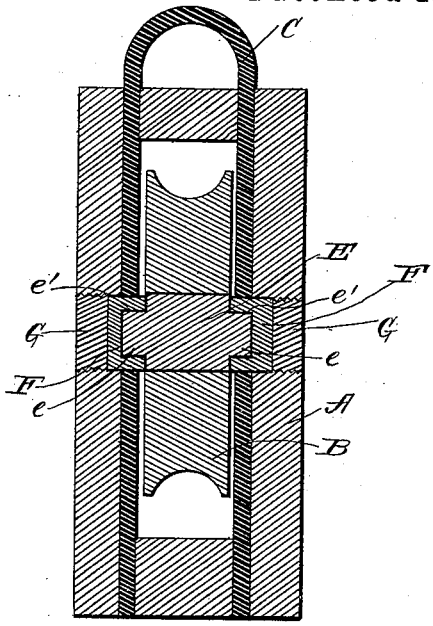
Figure 2:
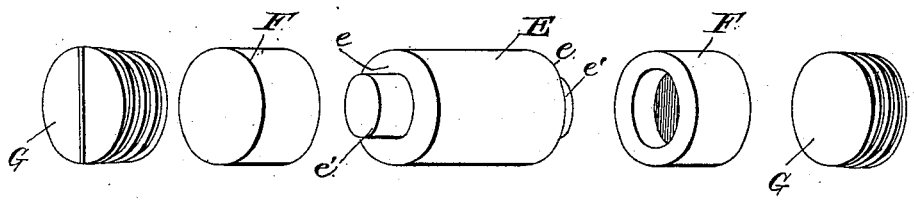
Figure 3:
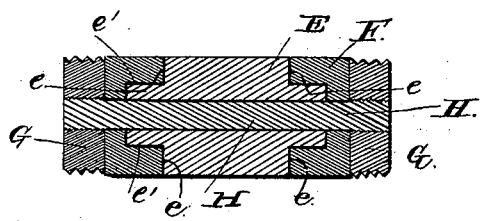

In the accompanying drawings, Figure 1 is a vertical transverse sectional view through the sheave and its shaft of a pulley constructed in accordance with my invention. Fig. 2 is a detached perspective view of my invention. Fig. 3 is a sectional view corresponding to Fig. 1, and showing another form of my invention.

Referring to the drawings, in which like letters of reference denote corresponding parts in all the figures, A designates the pulley-block, which is of the ordinary or any preferred construction, and having a grooved sheave, B, journaled therein, and a metallic strap, C, that is fitted in recesses formed in the opposing faces of the block and extended at its bent end to provide a loop that is used to secure the pulley in place.

The sheave B is loosely journaled on a shaft, E, which is provided at its ends with reduced shoulders $e$, that form trunnions $e'$, for the support of the shaft and sheave, the length of the shaft being equal to the width or space between the opposing inner faces of the block. The trunnions of this short shaft are journaled in cylindrical or tubular bearings F, that are fitted in the sides of the pulley-block, and to prevent longitudinal movement or play of the bearings and the accidental displacement thereof from the block, I provide the limiting-stops G, which are provided with exterior screw-threads to adapt the stop to be screwed into and retained in place in the sides of the block. The stops G are provided with a groove or nick, like a screw, to adapt them to be turned by a screw-driver.

The shoulders $e$ of the short shaft bear against the inner edges of the bearings F, while the trunnions $e'$ of said shaft enter within the bearings, and said shaft is free to rotate loosely in its bearings on the trunnions, and is prevented from longitudinal movement or play by the shoulders $e$ coming in contact with the inner edges of the bearings. It will thus be seen that the sheave is free to rotate on its shaft, and the latter is also free to rotate in its bearings, whereby the friction and wear on the various parts are reduced to a minimum and the sheave is prevented from binding, as it will be observed that should the sheave bind on its shaft and refuse to turn thereon, the latter will be rotated in its bearings and the sheave will be carried thereby in the revolutions of the shaft.

The shaft E and its bearings may be made solid, or they may be made hollow or tubular, as shown herein, and, if desired, the bearings F for the shaft may be fitted loosely in the openings provided therefor in the sides of the block, so that they are free to revolve therein and further reduce the friction of the parts, as shown in Fig. 3 of the drawings.

The ends of the stops G are made smooth and abut squarely against the outer ends of the bearings F to prevent any play thereof, and as the stops are firmly screwed into the block they are thereby held rigidly in place.

In Fig. 3 of the drawings I have shown a solid central shaft, H, extending longitudinally through the stops, the bearings, and the short shaft, all of which are made hollow or tubular, and the shaft is suitably secured in place to give strength and stability to the device.

It will be understood that I do not confine myself to the particular form of block shown herein, as my invention can be used upon or applied to pulleys of any class; and, furthermore, that I do not limit myself to the exact details of construction and form and proportion of parts herein shown and described as an embodiment of my invention, as I am aware that changes therein can be made without departing from the principle or sacrificing the advantages of my invention.

My invention is especially designed for use in that class of pulleys known as "purchase" pulleys; and when the invention is applied to the class of pulleys shown herein with the metallic strap C, the bearings F are to be fitted and supported in the said strap, so that the latter will sustain all the weight and strain on the sheave and the shaft.

Having thus fully described my invention, what I claim as new, and desire to secure by Letters Patent, is—

1. In a pulley, the combination of a block, the independent bearings fitted in the block, the shaft journaled in the bearings, a sheave carried by the shaft, and the stops affixed rigidly in and concealed by the block and in contact with the bearings for retaining them against movement, substantially as described.

2. The combination, in a pulley, of the independent bearings, the exteriorly-threaded stops affixed rigidly in the block and fitted against the bearings to retain them against lateral movement, and the shaft having the trunnions journaled in the bearings and the shoulders fitted against the bearings, and the sheave fitted loosely on the shaft, substantially as described.

3. In a pulley, the combination of a block having a strap, C, on its inner sides, the bearings fitted in the strap and the block, and a shaft journaled in the bearings and carrying a sheave, substantially as described, for the purpose set forth.

4. The combination of the rotatable shaft carrying the loose sheave, the bearings loosely mounted in the pulley-block and having the shaft journaled therein, and the fixed stops for retaining the bearings against longitudinal play, substantially as described.

5. In a pulley, the combination of a block, the independent hollow bearings fitted therein, a tubular shaft journaled in the bearings, a sheave carried by the shaft, the hollow stops secured rigidly in the block and concealed from view thereby and in contact with the bearings, and a central pin passing through the shaft, its bearings, and the stops, substantially as described, for the purpose set forth.

In testimony that I claim the foregoing as my own I have hereto affixed my signature in presence of two witnesses.

BETHUEL G. HANDY.

Witnesses:
E. G. SIGGERS,
JOHN H. SIGGERS.